INVENTOR
JEAN PETIN
AGENT

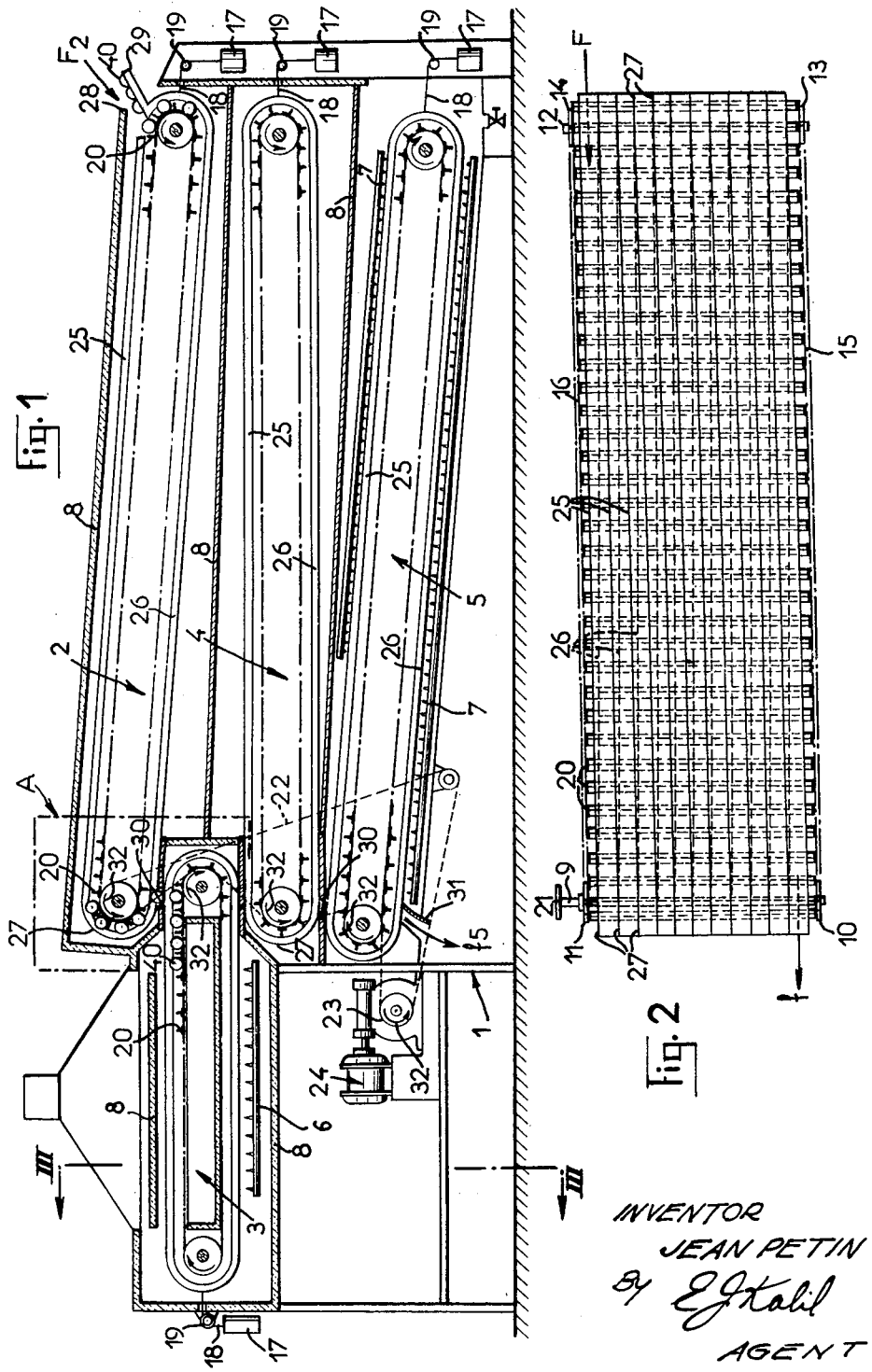

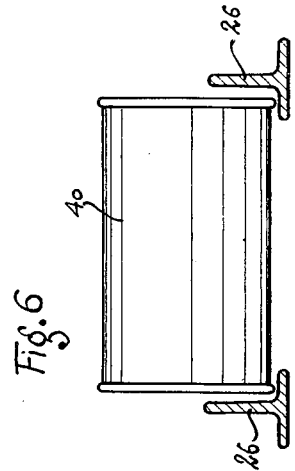
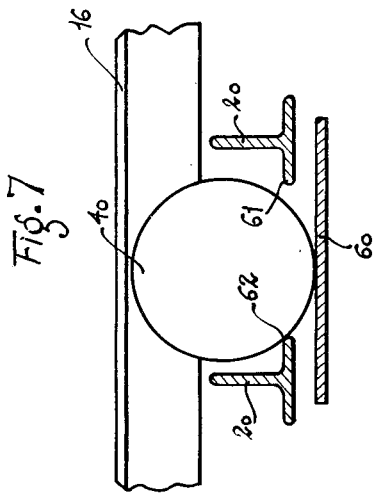
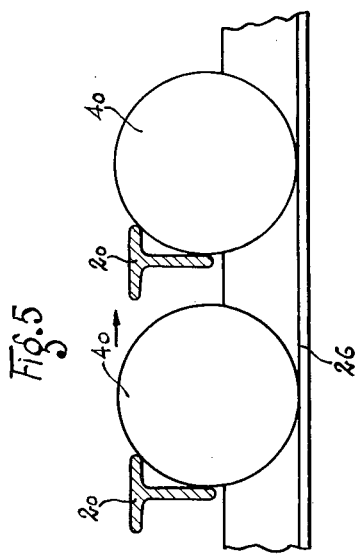
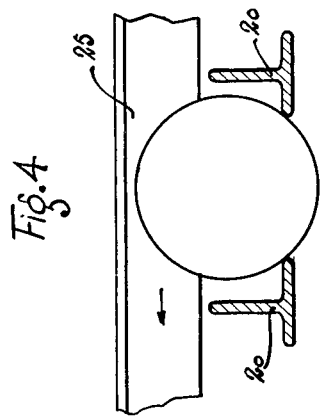
INVENTOR
JEAN PETIN
AGENT

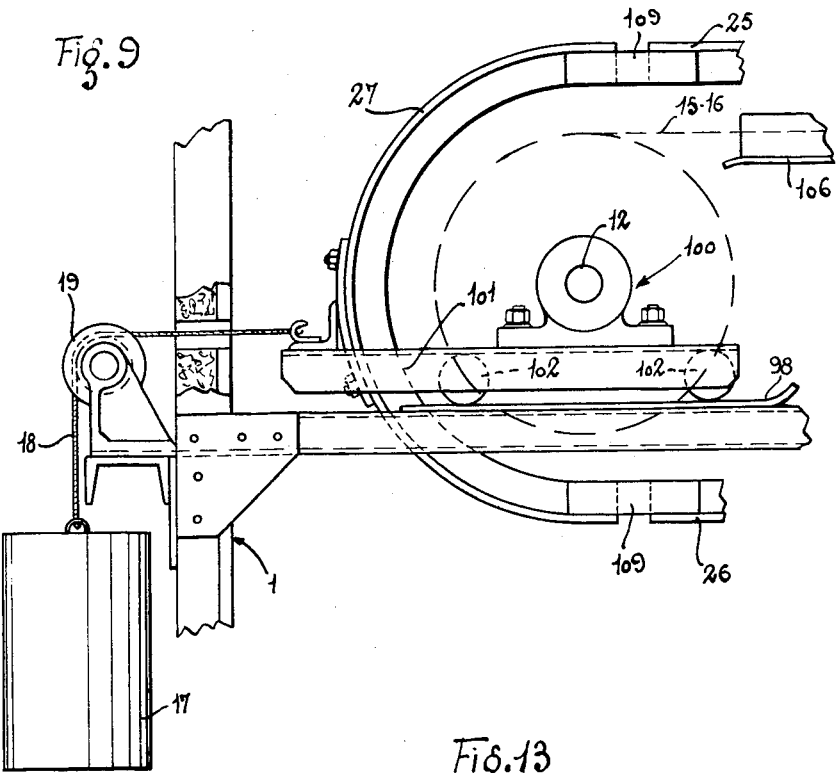
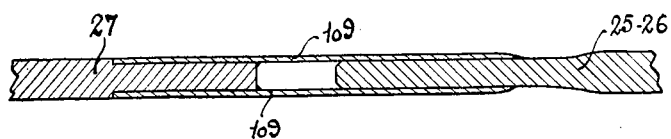
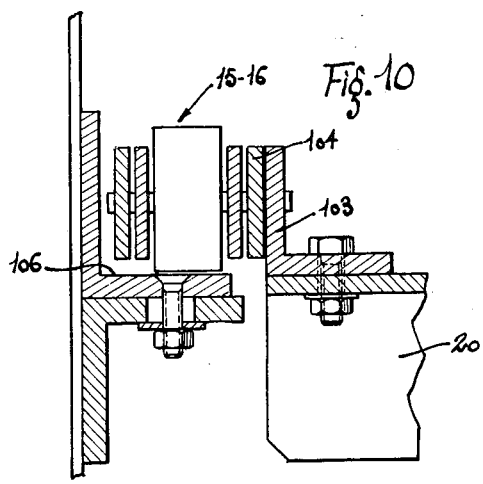

May 1, 1962 J. PETIN 3,032,171
APPARATUS FOR THE DISPLACEMENT OF OBJECTS, ESPECIALLY
FOR SERIES TREATMENTS
Filed Jan. 20, 1959 7 Sheets-Sheet 5

INVENTOR
JEAN PETIN
By E.J. Kalil
AGENT

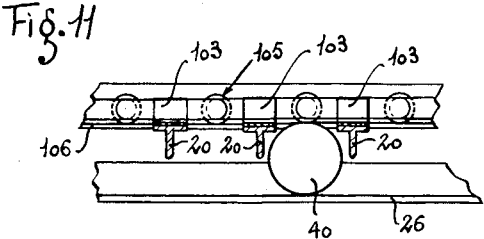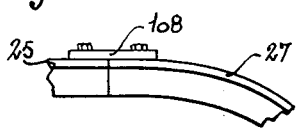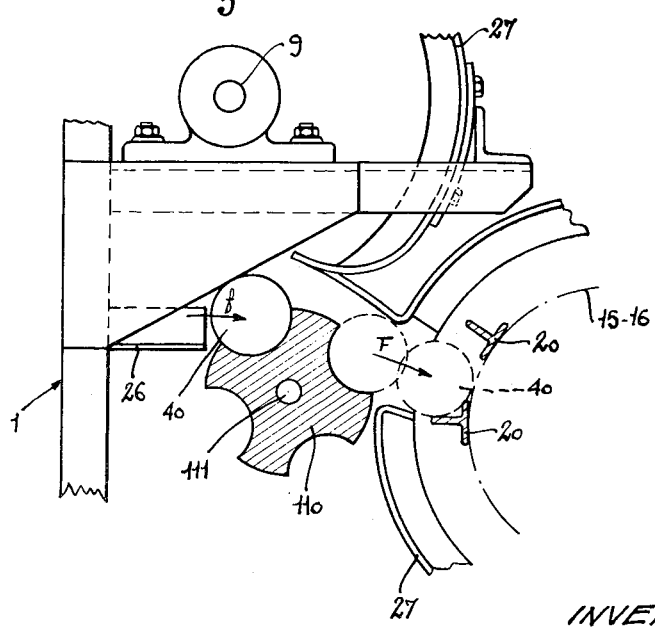

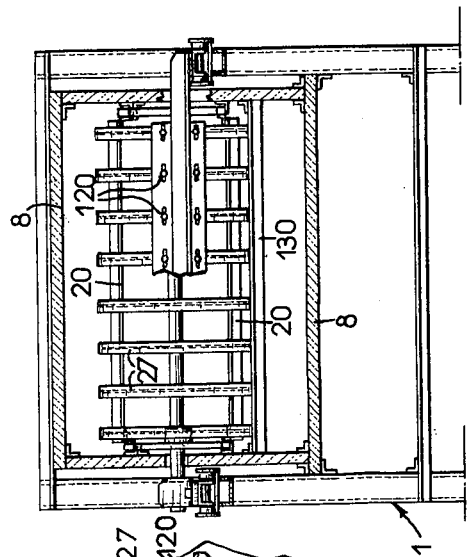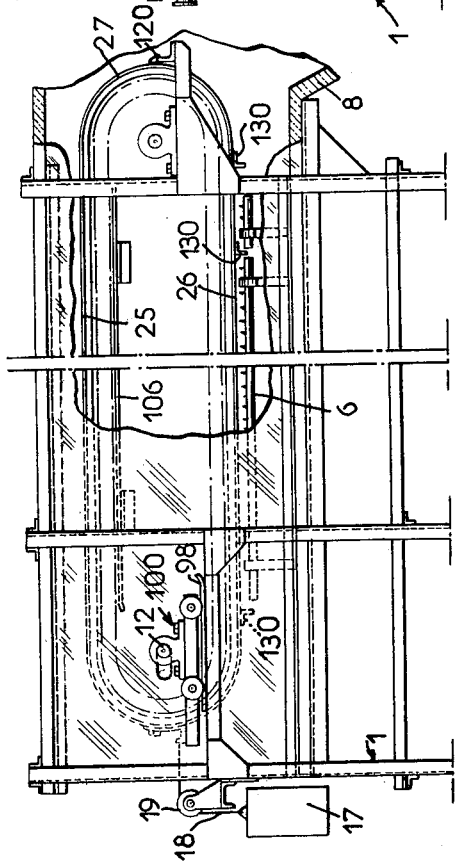

United States Patent Office 3,032,171
Patented May 1, 1962

3,032,171
APPARATUS FOR THE DISPLACEMENT OF OBJECTS, ESPECIALLY FOR SERIES TREATMENTS
Jean Petin, Paris, France, assignor to Etablissements J. J. Carnaud et Forges de Basse-Indre, Paris, France, a French company
Filed Jan. 20, 1959, Ser. No. 787,863
Claims priority, application France Jan. 31, 1958
3 Claims. (Cl. 198—159)

This invention relates to an apparatus for the displacement of objects especially for series treatments, used for example in industries manufacturing cylindrical objects such as metallic or non-metallic containers and in industries for the pasteurisation or sterilisation of the products contained by said containers.

The problems posed by the series treatment of objects, for example empty or full containers, are extremely varied. The temperature cycle required for each operation is clearly defined and must frequently be observed with precision; it is sometimes desirable to rotate the objects on themselves during treatment in order to accelerate or improve said treatment; in other cases, on the other hand, it is advisable to avoid as far as possible agitation of the contents and for this purpose to render the containers stationary on their axis during the treatment.

The treatment is generally effected by passing the objects through successive media where they undergo various partial treatments such as drying, heating, or cooling, in clearly defined conditions with regard to time, temperature or pressure.

Usually, a special apparatus for the displacement of the objects is made for each particular case, but this has certain disadvantages; moreover, in the apparatus used today the treated objects move in bundles or rows, so that the various objects of a bundle or row do not pass the same regions in space; in these conditions, it is practically impossible to ensure homogenity of treatment.

The object of the invention is to enable there to be produced a displacement apparatus of the kind described which is of simple and economic construction, universal character, that is to say capable of adaptation with a very high degree of flexibility to all the cycles of treatment at present found in industry, and which enables identical treatment conditions to be ensured for all the objects.

An apparatus according to the invention is distinguished especially in that it comprises at least one helicoidal conveyor containing a movable grid with parallel bars capable of moving along a closed directing curve and thus sweeping a cylindrical surface in which is arranged at least one fixed helicoidal passage, each pair of successive bars determining, with the edges of the passage, a movable compartment adapted to receive an object to be conveyed.

By means of this arrangement, the objects to be conveyed are displaced in file in the helicoidal passage, being separated from one another by the bars of the grid, each object passing exactly through the same region of space as all the other objects.

According to a particularly simple embodiment, the movable grid of the helicoidal conveyor is constituted by two identical closed chains disposed in two parallel planes, and of which the facing links are connected by parallel bars fixed at each of their ends on the cheeks of the said links; each chain is mounted on a toothed driving pinion or sprocket and on a toothed driven or reversing pinion or sprocket, the two driving pinions being mounted on the same driving shaft, and the two reversing pinions on the same reversing shaft. Thus the movable grid can move along a closed directing curve constituted by a rectangle in which the small sides are replaced by semi-circles.

According to one advantageous arrangement, the invention proposes to mount the chain reversing shaft on two bearings carried by a carriage adapted to slide on a fixed support in a direction perpendicular to the said shaft, said carriage being linked to an appropriate return or tensioning member, whereby the tension of the chains is ensured independently of expansions liable to modify their length. This return member may comprise a counter-weight connected to the carriage by a cable passing over a pulley.

In simple and economic manner the fixed helicoidal passage may be bounded by guides constituted by portions of T-section metallic profiles, of which some are rectilinear, the others being curved in the form of a semi-circle, being connected to one another, and of which the web, disposed radially, is placed along a helix over a cylindrical surface similar to the surface of displacement of the movable grid and of dimensions close to those of this surface.

For preference, means are provided so that the dimensions of the cylindrical surface in which the fixed helicoidal passage is arranged may be modified according to the variations of the dimensions of the surface of displacement of the grid under the influence of the expansions of the chains.

By means of this arrangement, the various regions of the helicoidal passage always remain at the same distance from the movable grid.

This result may be obtained by rigidly connecting to the carriage carrying the chain return shaft, portions of T-section guides curved into a semi-circle adjacent to said return shaft, said curved guide portions being connected by sliding joints to the fixed rectilinear guide portions.

The characteristics and advantages of the invention will be apparent from the following description given by way of example with reference to the accompanying drawings in which:

FIGURE 1 is a simplified view, in vertical longitudinal section, of an embodiment of an apparatus according to the invention comprising four helicoidal conveyors;

FIGURE 2 is a simplified view, from above, of one of the helicoidal conveyors of the apparatus shown in FIGURE 1;

FIGURES 4 and 5 are longitudinal sections, on a different scale, of two adjacent bars of the movable grid;

FIGURE 6 is a similar detail view but in cross-section;

FIGURES 7 and 8 are similar detail views, in longitudinal section, showing alternative embodiments;

FIGURE 9 is an elevation, on a large scale, of the movable carriage carrying the bearings for the chain return shaft of a helicoidal conveyor;

FIGURE 10 is a view in cross-section of the fastening of a bar of the movable grid onto one of the driving chains;

FIGURE 11 shows on a large scale one of the strands of a driving chain of the movable grid;

FIGURE 12 is a view showing the fastening of certain portions of the T-section guides bounding the fixed helicoidal passage;

FIGURE 13 is a longitudinal section of a sliding joint mounted between certain portions of said T-shaped guides;

FIGURES 13a and 13b are respectively a longitudinal section and a cross-section of one of the conveyors, showing the connections between said T-shaped guides and a supporting frame;

Figure 3:
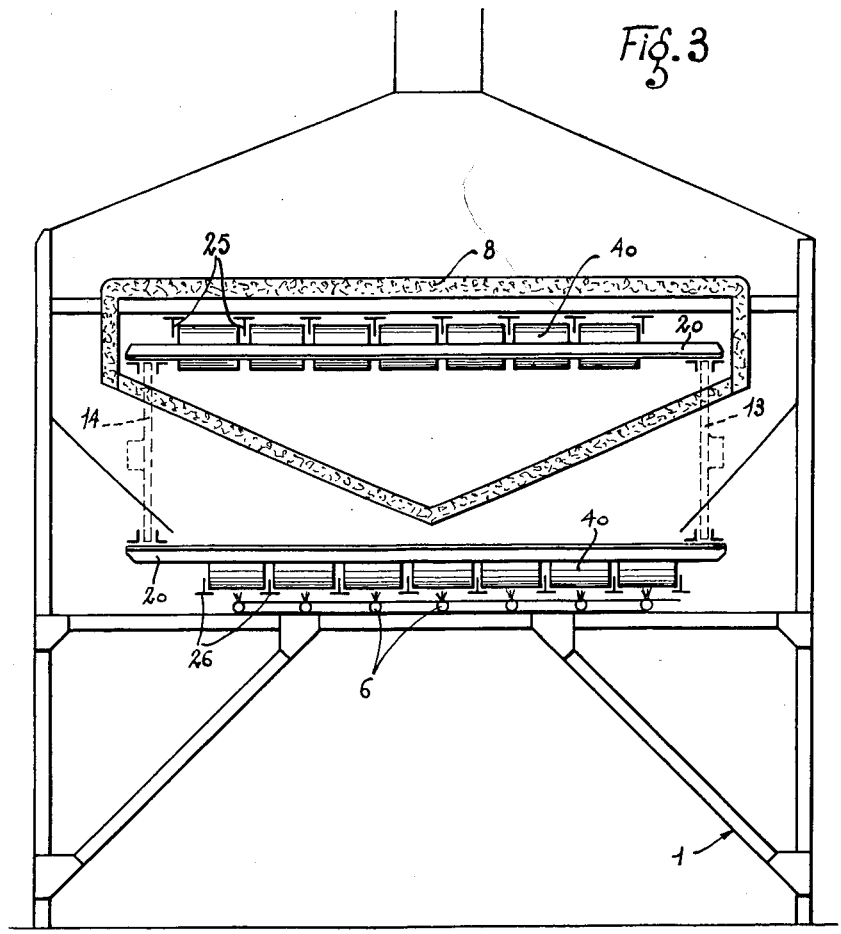
FIGURE 3 is a vertical cross-section on the line III—III of FIGURE 1, but on a larger scale and simplified.

FIGURE 14 relates to a device for transferring the objects to be treated from one helicoidal conveyor to the next conveyor.

According to the embodiment selected and shown in FIGURE 1, the apparatus comprises a frame 1, supporting four helicoidal conveyors 2, 3, 4 and 5. Each of said conveyors is housed in a chamber. The chambers containing the conveyors 2, 3 and 4 are thermally insulated. The chamber of the conveyor 3 also contains a bank 6 of hot fluid inlets, that of the conveyor 5 cold fluid inlets 7. These chambers are bounded by partitions 8.

Each helicoidal conveyor such as 2 (FIGURE 2) comprises a horizontal driving shaft 9 the axis of which is fixed in position in relation to the frame 1 and which can turn on two bearings (not shown in FIGURE 2) adjacent to its ends and integral with the frame 1; two chain sprockets 10 and 11, of the same diameter, are keyed on said shaft 9. The helicoidal conveyor also comprises another horizontal shaft 12, parallel to the shaft 9, carrying two other chain sprockets 13 and 14 of the same diameter, one of which is keyed and the other loose on said shaft. The axis of the shaft 12 is not fixed in position in relation to the frame 1: said shaft can turn on two bearings adapted to slide on a support connected to the frame 1, so as to enable the shaft 12 to move away from or close to the shaft 9; one of said bearings 100 is shown on a large scale in FIGURE 9: it is fixed on a carriage comprising U-sections or yokes 101 carried by rollers 102 rolling on a support 98.

Figure 1A:
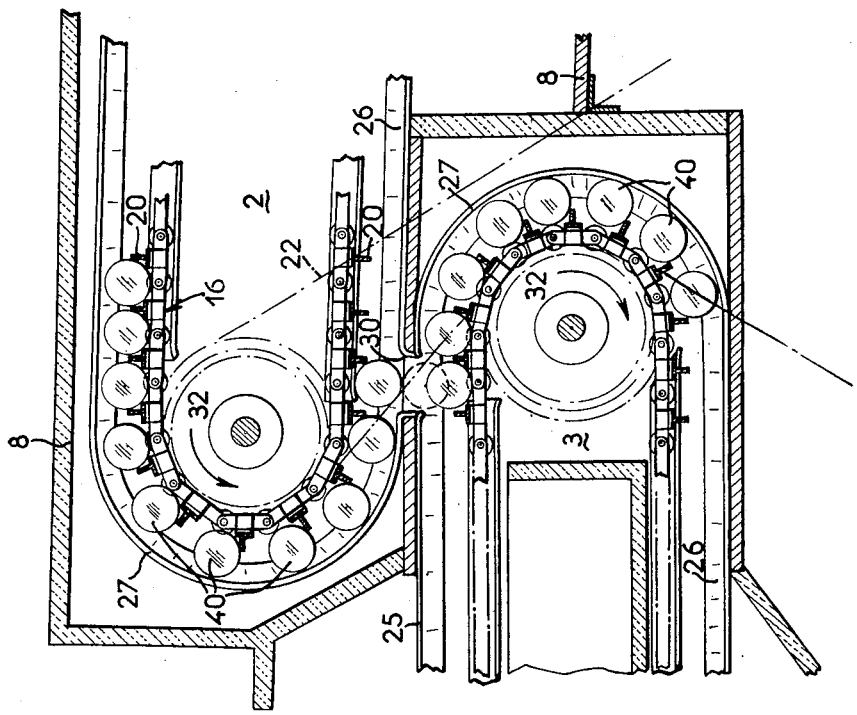
FIGURE 1a is an enlarged view of portion A of FIGURE 1, showing the direct transfer of objects from one conveyor to another.
Figure 10A:
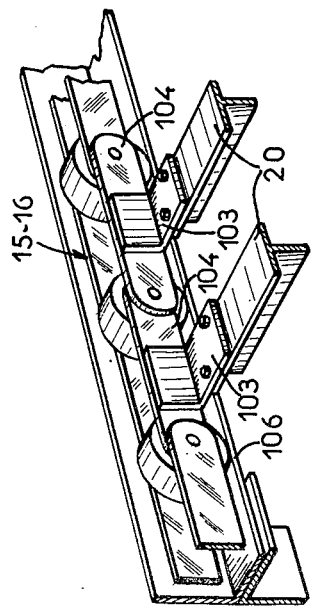
FIGURE 10a shows a perspective view of a segment of one of the driving chains.

A sprocket chain 15 passes over the pinions 10 and 13, and another similar chain 16 passes over the pinions 11 and 14. A counter-weight 17 (FIGURES 1 and 9) supported by a cable 18 passing over a pulley 19, of which the shaft is integrally mounted via a bracket to frame 1 (FIGURE 9), exerts on the shaft 12, through the medium of the bearings 100, a traction perpendicular to the axis of said shaft, which, producing a slight movement of translation of said axis, ensures the tension of the chains 15 and 16. Parallel conveying bars 20, profiled for example in the form of a T, couple the chains 15 and 16; each of said bars 20 is mounted at one of its ends on the inside face of a link of the chain 15 and at its other end on the inside face of the corresponding link of the chain 16; according to FIGURES 10 and 10a which show on a large scale the fastening of bars 20 on a chain 15 or 16, at each end of the bars 20 is fixed one of the flanges of an angle section 103 the other flange of which is riveted on the inside face 104 of a link of one of the chains. When the bars 20 comprise T-shape profiles, they are disposed in such manner that the web of said profiles is directed towards the exterior of the conveyor (FIGURE 1a).

In addition to sprockets 10 and 11, the shaft 9 of each helicoidal conveyor of the kind denoted by reference 2 carries a driving sprocket 21 driven by a drive chain 22 (FIGURE 1) also passing over a pinion 23 of a speed reduction gear of a motor 24. In this way, under the drive of the motor 24, the grid constituted by the bars 20 of each helicoidal conveyor can move in a direction perpendicular to the orientation of the bars 20. During this motion, the lower strand 105 of the driving chains 15 and 16 is supported by a longitudinal section 106, shown on a large scale in FIGURES 10 and 11, in which is arranged an expansion joint of known type; the upper strand is in turn supported by another similar longitudinal guide (FIGURE 9).

Metallic T-shaped longitudinal profiles 25, shown in solid lines in FIGURE 2, are disposed in the form of a flat sheet above the plane of the upper strands of the chains of each conveyor and parallel to said plane; these profiles 25 are parallel to one another, their web is directed vertically downward (FIGURE 3) and their direction forms a small angle with the direction of the planes of the chains 15 and 16 (FIGURE 2); the webs of the profiles 25 thus constitute upper vertical guides bounding between them equal parallel passages. In a similar manner longitudinal T-shaped profiles 26, shown in broken lines in FIGURE 2, are disposed in the form of a flat sheet below the plane of the lower strand of the chains 15 and 16 and parallel to said plane; these profiles are also parallel to one another, their web is directed vertically upward, and with the direction of the planes of the chains 15 and 16 their direction forms an angle of a direction opposite to that of the profiles 25 with the same direction; the webs of these profiles 26 constitute lower vertical guides bounding between them equal parallel passages.

Profiles curved into the form of a semi-circle 27, of a T-shaped section of the same dimensions as the section of the profiles 25 and 26, each join one end of a lower guide 26 to the end of an upper guide 25 plumb with it; the web and the flanges of the profiles 27 are connected to the web and to the flanges of the profiles 25 and 26. The connections of the longitudinal profiles 25 or 26 to the curved profiles 27 are effected at the "fixed" end of the conveyor, that is to say plumb with the shaft 9, by means of a butt-plate 108 (FIGURE 12). At the "movable" end, that is to say plumb with the shaft 12 (FIGURES 9 and 13), these connections are effected by means of a sliding joint; the end of the profiles 25 or 26 can move between two face plates 109 fixed on the profiles 27: the profiles 27 of the "movable" end of the conveyor are in fact connected to the carriage carrying the bearings of the shaft 12 and, under the action of the counter-weight 17, thus move at the same time as said carriage (FIGURE 9): by means of this arrangement the profiles 27 thus always remain at the same distance from the conveying bars 20. On the other hand, the profiles 27 at the "fixed" end of the conveyor are rigidly connected to the frame 1 as shown in 120 in FIGURES 13a and 13b.

A single continuous path is thus formed by the profiles 25, 26 and 27, said path commencing for example at the arrow F (FIGURE 2) and terminating at the arrow f. This path has the form of a helix traced over a cylinder of which the directing curve is constituted by a rectangle in which the small sides are replaced by semi-circles.

As shown in FIGURES 13a and 13b, the guide elements 25, 26, 27 are connected to frame 1 by profiles 130 integral with said frame 1 and supporting lower guides 26.

For the entry of the objects to be conveyed 40 into the first helicoidal conveyor 2, an aperture 28 is provided in the upper wall of the chamber which contains it, plumb with the beginning F2 of the helicoidal path, mentioned above, of the conveyor 2. Through this aperture passes an inlet chute 29 on which are supplied the objects 40 to be treated. Similar appropriate apertures 30 are provided in the horizontal walls of the other chambers for the entry and departure of the objects 40. Each aperture 30 is situated plumb with the outlet f of a conveyor and the inlet F of another conveyor; appropriate channels are contrived in the flanges of the guides 25, 26 or 27 to clear the inlet F and the outlet f (FIGURE 1a).

This passage from one conveyor to the other is effected only at the "fixed" end of said conveyors. Departure from the last conveyor 5 is effected according to f5 through an outlet chute 31.

The operation is as follows.

The motor 24 being in operation, the bars 20 hence being in motion, each object 40, which is assumed to be approximately cylindrical, arriving on the inlet chute 29 falls, under the action of its own weight alone, that is to say without the assistance of a distributing device, between two consecutive bars 20 and also between two webs of adjacent profiles 25, so that the axis of said object is parallel to the bars 20 (FIGURE 3). The space between the webs of two bars 20 is contained between once and twice the diameter of the objects 40, so that a single object can be housed between them. Thus each bar 20 takes an object from each of its passages, as long as the chute 29 contains said objects. Each object is then transported in the position as shown in FIGURE 4 from right to left of the conveyor 2. When it has arrived plumb with the shaft 9 (FIGURE 2) it traverses a semi-circle in the downward direction, guided in this movement by the flanges of two adjacent profiles 27; it then arrives below the shaft 9 and, moving from left to right, takes one of the rectilinear passages bounded by the webs of two adjacent lower profiles 26; along this rectilinear passage it is pushed by a conveying bar 20 and rolls on two flanges of the profiles 26 (FIGURES 5 and 6); plumb with the shaft 12, on its upward path it traverses another semi-circle then arrives in the second upper rectilinear passage adjacent to the upper passage previously taken: it moves in this passage from right to left and so on until it has covered the entire helicoidal path described above. Under the action of its own weight it passes through the aperture 30 to the second helicoidal conveyor 3 (FIGURE 1a) and then, after having traversed the latter, on the conveyor 4 and then on the conveyor 5. Each passage from one conveyor to the next conveyor is effected in similar manner to the arrival in the conveyor 2 as described previously.

In the apparatus shown in FIGURE 1, the directions of rotation of the driving shafts 9 are indicated by arrows 32. During the passage in this apparatus each object first passes in the conveyor 2 from right to left of an observer situated level with the counter-weights 17 in FIGURE 1. It then enters the conveyor 3 where it covers a path taking it from left to right of the aforesaid observer. It leaves this and enters the conveyor 4 where the path taken is from right to left of the same observer; it then passes into the conveyor 5 where it moves from left to right.

By appropriate choice of the distances between the shafts 9 and 12 of the various conveyors, the number of passages between the profiles 25, 26, 27, the speed of motion of the chains 15 and 16, the apparatus can be adapted to any desired program for the treatment of the objects. Thus in the apparatus shown in FIGURE 1 the element 2 serves for pre-heating, the element 3 for more intense heating or baking, the element 4 for stabilisation of the temperature obtained and the element 5 for cooling; heating of the element 3 can be effected by supplying hot fluid through the pipelines 6, cooling of the element 5 by supplying cold fluid by means of the banks 7. During these operations, the objects to be treated always remain spaced from one another, so that the intervals separating them permit the ready passage of heating or cooling fluids, which accelerates the heat exchanges.

The treatment program is strictly the same for all objects since each of them passes exactly at the same location as all the others.

The production of the apparatus described is particularly economic; in fact it requires only inexpensve materials and uses only a very small number of machined mechanical parts.

Figure 8:
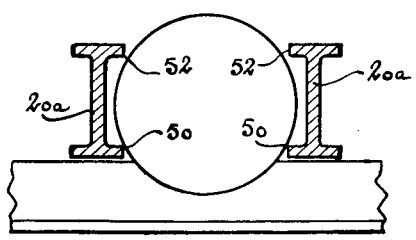

A description will now be given with reference to FIGURES 7 and 8 of alternative embodiments of the apparatus which, although relating only to the details of execution, may substantially change the characteristics of use.

As explained hereinabove, in the conveyors shown in FIGURES 1, 2 and 3, at the upper stage, the objects 40 supported and carried by the bars 20 move without rolling (FIGURE 4); on the lower stage they roll on two flanges of the profiles 26, pushed by the bars 20 (FIGURE 5).

Now in some cases the objects to be treated may be containers which are full of liquid which sometimes cannot withstand slightly vigorous agitation; the conveying bars may then comprise I-shaped profiles, 20a (FIGURE 8): then, on the lower stage, the containers rest without rolling on the edges 50 of the outside webs of said profiles; on the upper stage, they will rest on the edges 52 of the inside flanges of said profiles.

In other cases on the other hand it may be necessary to allow the containers to roll both on the upper stage and on the lower stage; to this end, beneath the plane of the flanges of the upper bars 20 a supporting level plate 60 (FIGURE 7) may be provided which raises the containers and prevents their being supported by the edges 61 and 62 of the bars 20; on the upper stage the containers then move by rolling on the plate 60.

With reference to FIGURE 14 a description will now be given of a method of passing from one conveyor to the other, which differs from that of the apparatus shown in FIGURE 1: in this latter apparatus the "fixed" ends of the conveyors overlap one another and by this fact the passage of the objects from one conveyor to the other is effected solely by the action of their weight. On the other hand, when the conveyors are placed practically end to end, the fixed ends not overlapping, a different method of transfer may be adopted; according to FIGURE 14, the object leaving one conveyor at *f* is transported by a spider 110 to the inlet F of the following conveyor. The spider 110 is keyed on a shaft 111 which is in turn driven by the driving chain 22 (FIGURE 1).

The apparatus described may also be amenable to numerous other variations without departing from the scope of the invention, the constructive arrangements described having no limitative character. Moreover, the apparatus may contain any number of conveyor elements; the treatments undergone by the objects therein may be very varied.

What I claim is:

1. A conveyor for displacing cylindrical articles comprising a frame, an endless movable conveyor grid formed of a plurality of horizontally spaced parallel bars connecting two identical endless chains disposed facing each other in two parallel vertical planes on opposite sides of the grid, each chain passing over two horizontally spaced sprockets mounted on shafts supported by said frame so that the grid is confined over a closed circuit comprising an upper rectilinear portion, a lower rectilinear portion and two semi-circular portions joining said rectilinear portions, the ends of said bars being rigidly secured to links of the chains and each bar comprising a web perpendicular to the direction of movement of the bars and two symmetrical inner flanges disposed on the inside edge of said web, the distance between the confronting edges of said inner flanges of two adjacent bars being smaller than the diameter of the articles to be conveyed, means for driving said shafts, a stationary helical channel formed between guide elements supported by said frame exterior of and proximate to said endless grid, said helical channel surrounding said endless grid substantially in the direction of movement of said grid and extending over several turns around said grid between an inlet station near one side of the grid and an outlet station near the other side of the grid, the width of said channel being greater than the axial length of the articles to be conveyed so that each successive pair of grid bars form with the sides of the channel a movable compartment adapted to receive an article to be conveyed, means arranged at said inlet station for charging an article into each compartment with the axis of the article parallel to the grid bars, and means arranged at said outlet station for discharging articles from said compartments.

2. A conveyor as defined in claim 1, wherein the distance between the confronting edges of the inner flanges of two adjacent bars is great enough to allow an article placed between said adjacent bars to partially project between said inner flanges in the upper portion of the grid circuit, and wherein a supporting plate is disposed beneath and parallel to said upper portion, the distance between said plate and said upper portion being such as the plate raises the articles in the upper portion and prevents their being supported by said confronting edges of the inner flanges.

3. A conveyor as defined in claim 1, wherein each bar of the grid further comprises two outer symmetrical flanges disposed on the outside edge of the web, the distance between the confronting edges of said outer flanges of two adjacent bars being such that during movement over the semi-circular portions of the grid circuit articles can be charged therebetween, and during the lower rectilinear portion of said circuit the articles are supported by said confronting edges of said outer flanges without shaking of said articles.

References Cited in the file of this patent

UNITED STATES PATENTS

| | | |
|---|---|---|
| 433,800 | Mayo | Aug. 5, 1890 |
| 723,504 | Titus | Mar. 24, 1903 |
| 1,377,088 | Martin | May 3, 1921 |
| 1,491,958 | Logan et al. | Apr. 29, 1924 |
| 1,570,235 | Fooks | Jan. 19, 1926 |
| 1,580,193 | Fooks | Apr. 13, 1926 |
| 1,726,139 | Blasco | Aug. 27, 1929 |
| 2,386,619 | Long et al. | Oct. 9, 1945 |
| 2,400,502 | Hapman | May 21, 1946 |
| 2,497,655 | Bramson | Feb. 14, 1950 |
| 2,818,185 | Mickey et al. | Dec. 31, 1957 |